(12) United States Patent
Lee et al.

(10) Patent No.: US 10,005,367 B2
(45) Date of Patent: Jun. 26, 2018

(54) WIRELESS CHARGING OF A VEHICLE POWER SOURCE

(71) Applicant: Toyota Motor Engineering & Manufacturing North America, Inc., Erlanger, KY (US)

(72) Inventors: Jae Seung Lee, Ann Arbor, MI (US); Atsushi Iwai, Novi, MI (US); Paul Donald Schmalenberg, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 127 days.

(21) Appl. No.: 14/813,437

(22) Filed: Jul. 30, 2015

(65) Prior Publication Data
US 2017/0028854 A1  Feb. 2, 2017

(51) Int. Cl.
*H02J 7/00* (2006.01)
*B60L 9/00* (2006.01)
*B60L 11/18* (2006.01)

(52) U.S. Cl.
CPC ......... *B60L 11/182* (2013.01); *B60L 11/1829* (2013.01); *B60L 11/1835* (2013.01);
(Continued)

(58) Field of Classification Search
CPC .......... Y02E 60/12; H02J 7/025; H01F 38/14; Y02T 90/122; Y02T 10/6286;
(Continued)

(56) References Cited

U.S. PATENT DOCUMENTS 8,030,888 B2   10/2011   Pandya et al.
8,626,391 B2   1/2014    Kim
(Continued)

FOREIGN PATENT DOCUMENTS

DE    102015202435 A1 *   8/2015   ........... G05D 1/0225

OTHER PUBLICATIONS

Morris; "Utah State University builds a dynamic wireless charging test track"; Charged Electric Vehicles Magazine (http://chargedevs.com); posted Jan. 7, 2015; (12 pages).
(Continued)

*Primary Examiner* — Yalkew Fantu
*Assistant Examiner* — Mohammed J Sharief
(74) *Attorney, Agent, or Firm* — Christopher G. Darrow; Darrow Mustafa PC (57) ABSTRACT

Arrangements directed to the wireless charging of a vehicle are described. A battery of a vehicle can be charged while the vehicle is traveling on a roadway. A driving environment of the vehicle can be sensed to detect a charging marker. The charging marker can provide information relating to a location of a charge transmitter located below a travel surface of the roadway. The charge transmitter can be located forward of the vehicle in the travel direction of the roadway. The location of the charge transmitter can be determined based on information obtained from the charging marker. A travel path for the vehicle can be determined based at least partially on the location of the charge transmitter so that the charge receiver is positioned in substantial charging alignment with the charge transmitter as the vehicle passes over the charge transmitters.

10 Claims, 6 Drawing Sheets

(52) U.S. Cl.
CPC ............. *B60L 11/1838* (2013.01); *H02J 7/00* (2013.01); *B60L 2250/16* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC ... B60L 11/182; B60L 11/1838; B60W 20/00; B60W 10/08; B60W 10/06; B60K 6/445
USPC ............................................ 320/108; 701/22
See application file for complete search history.

(56) References Cited

U.S. PATENT DOCUMENTS

| | | | |
|---|---|---|---|
| 2008/0265684 A1 | 10/2008 | Farkas | |
| 2010/0328054 A1* | 12/2010 | Yim | G05D 1/0234 340/425.5 |
| 2011/0291615 A1* | 12/2011 | Pandya | B60L 5/005 320/108 |
| 2013/0141520 A1 | 6/2013 | Zhang et al. | |
| 2013/0293714 A1 | 11/2013 | Zhang et al. | |
| 2015/0094887 A1* | 4/2015 | Kawashima | B60L 11/182 701/22 |
| 2015/0231981 A1* | 8/2015 | Kees | G05D 1/0225 701/22 |
| 2016/0325631 A1* | 11/2016 | Lannoije | B60L 11/182 |

OTHER PUBLICATIONS

Suh et al.; "Electric Vehicle On-Road Dynamic Charging System with Wireless Power Transfer Technology"; IEEE 2013; pp. 234-240; (7 pages).
Shinar et al.; "Effects of Practice on Interference From an Auditory Task While Driving: A Simulation Study"; U.S. Department of Transportation National Highway Traffic Safety Administration; Dec. 2004; (54 pages).

\* cited by examiner

WIRELESS CHARGING OF A VEHICLE POWER SOURCE

FIELD

The present disclosure relates in general to wireless charging of a power source, and, more particularly, to wireless charging of a power source for a vehicle.

BACKGROUND

Recently, there has been a shift in the automotive industry from gas-powered engines to electrically powered engines. Electrically powered engines use one or more electric motors for propulsion. At least one battery is used to power such electric motors. The at least one battery can be rechargeable. The charging of the vehicle batteries is a new task for drivers. Some batteries can be charged by connecting a power cord from a wall outlet to an input terminal of the vehicle.

Some batteries may also be charged wirelessly. For instance, some wireless charging systems require a driver to park the vehicle at a charging station such that a charge receiver on the vehicle is aligned with the charge transmitter at the charging station. Other wireless charging systems are designed for vehicles to be charged while driving along a road.

SUMMARY

In one respect, the present disclosure is directed to a charging system for a vehicle. The system can include a charge receiver. The system can include a sensor configured to detect a charging marker. The charging marker can provide information relating to a location of a charge transmitter located below a travel surface of a roadway. The charge transmitter can be located forward of the vehicle in a travel direction of the roadway. The system can include a processor operatively connected the sensor. The processor can be configured to determine the location of the charge transmitter based on the information obtained from the charging marker. The processor can be configured to determine a travel path for the vehicle based at least partially on the location of the charge transmitter so that the charge receiver is positioned in substantial charging alignment with the charge transmitter as the vehicle passes over the charge transmitter.

In another respect, the present disclosure is directed to a charging roadway system for a vehicle. The system includes a roadway. The roadway includes a travel surface. The system can also include a charge transmitter located below the travel surface of the roadway. The system can further include a charging marker. The charging marker can be operatively positioned along the roadway. The charging marker can provide information relating to a location of the charge transmitter.

In still another respect, the present disclosure is directed to a method of charging a power source of a vehicle while the vehicle is traveling on a roadway. The method includes sensing a driving environment of the vehicle to detect a charging marker located in the driving environment. The charging marker can provide information relating to a location of one or more charge transmitters located at or below a travel surface of a roadway. The one or more charge transmitters can be located forward of the vehicle in the travel direction of the roadway. The method can include determining the location of the one or more charge transmitters based on information obtained from the charging marker. The method can include determining a travel path for the vehicle based at least partially on the location of the one or more charge transmitters so that the charge receiver is positioned in substantial charging alignment with the one or more charge transmitter as the vehicle passes over the one or more charge transmitters.

DETAILED DESCRIPTION

The present disclosure is directed to wireless charging of a power source of a vehicle. In one or more arrangements, the location of one or more charge transmitters embedded in a roadway can be determined based on information obtained from a charging marker located in the driving environment of the vehicle. A travel path for the vehicle can be determined based at least partially on the location of the one or more charge transmitters so that the charge receiver is positioned in substantial charging alignment with the one or more charge transmitters as the vehicle passes over the one or more charge transmitters. Arrangements described herein include methods, vehicles, and roadways configured for such wireless charging.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting, but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
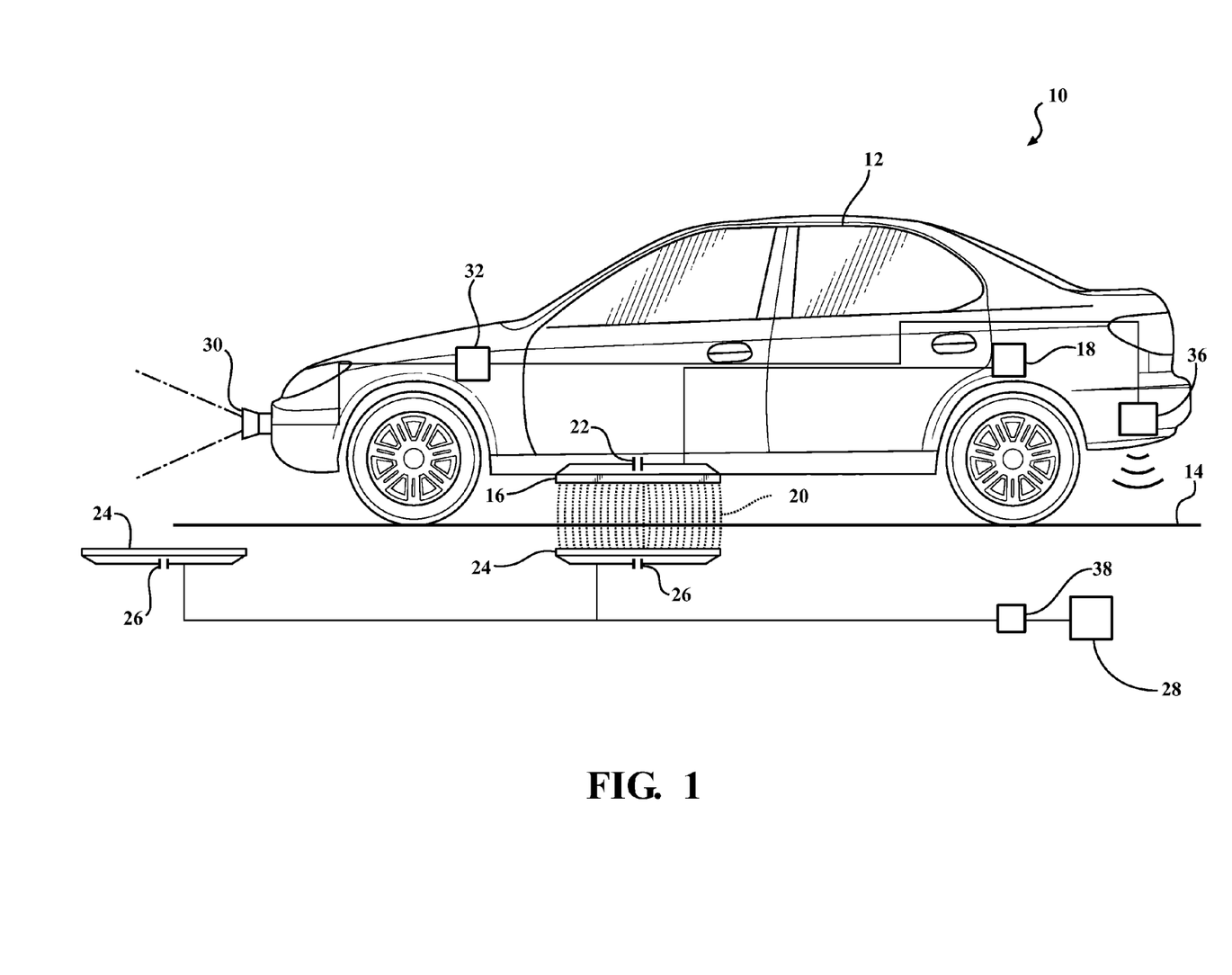
FIG. 1 is a view of an example of an wireless charging system for a vehicle.
Figure 2:
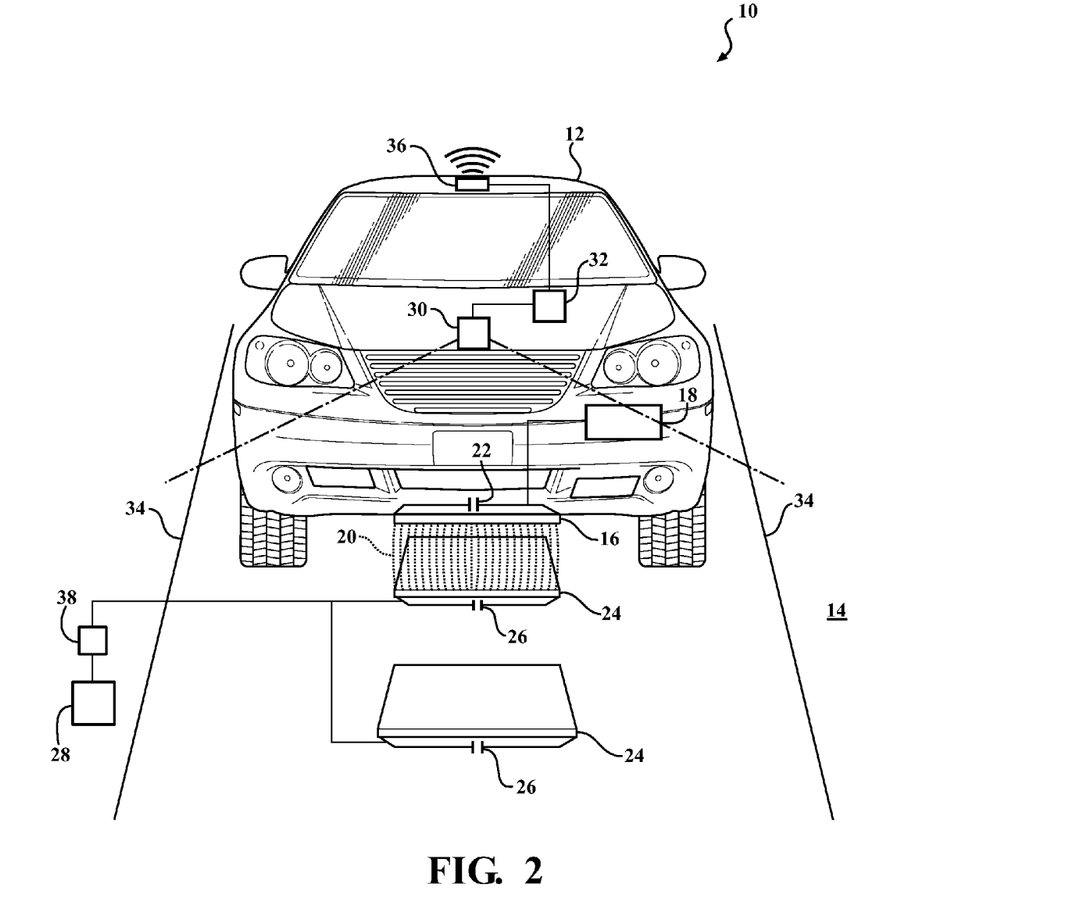
FIG. 2 is another view of the wireless charging system of FIG. 1.

Referring now to FIGS. 1 and 2, an example of a wireless charging system 10 is shown. The wireless charging system 10 includes a vehicle 12 and a roadway 14. The roadway 14 will also be referred to herein as the dynamic charging roadway 14.

The vehicle 12 can be any suitable type of vehicle. As used herein, "vehicle" means any form of motorized transport. In one or more implementations, the vehicle 12 can be an automobile. While arrangements will be described herein with respect to automobiles, it will be understood that embodiments are not limited to automobiles. In one or more implementations, the vehicle 12 can be a watercraft, an aircraft, a space craft, a golf cart, a motorcycle, and/or any other form of motorized transport. In one or more arrangements, the vehicle 12 can be a battery electric vehicle, a plug-in hybrid electric vehicle, or any other form of electric vehicle.

The vehicle 12 can include various elements. Some of the possible elements of the vehicle 12 are shown in FIG. 1 and will now be described. It will be understood that it is not necessary for the vehicle 12 to have all of the elements shown in FIGS. 1 and 2 or described herein. The vehicle 12 can have any combination of the various elements shown in FIGS. 1-2. Furthermore, the vehicle 12 can have additional elements to those shown in FIGS. 1 and 2. In some arrangements, vehicle 12 may not include one or more of the elements shown in FIGS. 1-2. Further, while the various elements are shown as being located within the vehicle 12 in FIGS. 1-2, it will be understood that one or more of these elements can be located external to the vehicle 12. Further, the elements shown may be physically separated by large distances.

The vehicle 12 can include a charge receiver 16 and a battery 18. "Charge receiver" is a component or group of components capable of receiving and/or configured to receive an electromagnetic field 20 from an electromagnetic energy source for purposes of charging the battery 18.

Although a battery 18 is disclosed as an example, it should be understood that any power source capable of energizing an electric motor could be added or supplemented to the vehicle 12 and still be within the scope of the present disclosure.

The charge receiver 16 can be operatively connected to the battery 18. The term "operatively connected," as used throughout this description, can include direct or indirect connections, including connections without direct physical contact. The vehicle 12 can also include protective circuitry (not shown) operatively connected between the charge receiver 16 and the battery 18 to prevent the battery 18 from overcharging, short-circuiting, and/or any other problems that can arise during charging. The vehicle 12 can also include current, voltage, power, and/or efficiency testing circuitry (not shown) operatively connected between the charge receiver 16 and the battery 18.

In one or more arrangements, the charge receiver 16 can be a coil, a solenoid, an induction pad, and/or a resonator. The vehicle 12 also includes at least one capacitive element 22, such as a capacitor or variable capacitor. The capacitive element 22 can be operatively connected in series or in parallel with the charge receiver 16 to form an L-C circuit. The capacitive element 22 and the charge receiver 16 can be operatively connected to the battery 18.

The battery 18 can be any component or group of components capable of receiving and storing electrical energy for consumption. Any suitable battery can be used. For example, the battery 18 can be a lead-acid battery, a nickel-metal hybride battery, lithium ion battery, or any other kind of battery that can be used to power the vehicle 12.

The roadway 14 includes at least one charge transmitter 24. "Charge transmitter" is any component or group of components capable of transmitting and/or configured to transmit an electromagnetic field for purposes of charging a battery or other power source. In some instances, the charge transmitter may be referred to as an electromagnetic energy source.

As used herein, "roadway" means a thoroughfare, route, path or way between two places and upon which a vehicle can travel. The roadway may be paved or otherwise improved to facilitate travel by a vehicle thereon. In some instances, the roadway may be unpaved or undeveloped. The roadway may be a public road or a private road. The roadway can include or be a part of one or more bridges, tunnels, supporting structures, junctions, crossings, interchanges, and toll roads.

The roadway 14 can include one or more travel lanes. A "travel lane" is a portion of a road that is designated for use by a single line of vehicles and/or a portion of a road that is being used by a single line of vehicles. In some instances, the one or more travel lanes can be designated by markings on the road or in any other suitable manner. In some instances, the one or more travel lanes may not be marked. Vehicles can move in or can be designated to move in one or more travel directions on the roadway.

As shown in FIG. 1 through FIG. 4, the roadway 14 can include a plurality of charge transmitters 24. The charge transmitter 24 can be a coil, a solenoid, an induction pad, a resonator, or any other inductive device capable of transmitting and/or configured to transmit an electromagnetic field 20 for charging the battery 18. The charge transmitter 24 can include at least one capacitive element 26, such as a capacitor or a variable capacitor. The capacitive element 26 can be operatively connected in series or in parallel to the charge transmitter 24 to form an L-C circuit.

The charge transmitter 24 can be operatively connected to a power source 28. The power source 28 can be an AC power source or a DC power source. The power source 28 be and/or can receive electrical energy from any suitable source, including, for example, an electrical power grid, a combustible engine generator, chemical energy, solar energy, and/or any other form of energy source that can operate the charge transmitter 24.

In one or more arrangements, the charge receiver 16 can be movable relative to the charge transmitter 24. In this example, the charge receiver 16 is movable relative to the charge transmitter 24 because it is mounted on the vehicle 12, but it should be understood that the charge receiver 16 can be mounted on any movable device, component, or machinery having the battery 18 or other power source that is capable of being electrically charged.

The vehicle 12 can include one or more sensors 30. "Sensor" means any device, component, and/or system that can detect, determine, assess, monitor, measure, quantify, and/or sense something. The one or more sensors 30 can be configured to detect, determine, assess, monitor, measure, quantify, and/or sense in real-time. As used herein, the term "real-time" means a level of processing responsiveness that a user or system senses as sufficiently immediate for a particular process or determination to be made, or that enables the process to keep up with some external process. The one or more sensors 30 can be any suitable type of sensor, including but not limited to a camera sensor, an infrared sensor, or any other sensor capable of detecting a marker 40 positioned on the roadway 14. The sensor 30 can be positioned in any suitable location on the vehicle 12. Although one sensor is described in the present example, in one or more arrangements, two or more sensors may be provided. In the case of a plurality of sensors 30, the sensors 30 can work independently of each other. Alternatively, two or more of the plurality of sensors 30 can work in combination with each other. In such case, the two or more sensors 30 can form a sensor network.

In one or more arrangements, the sensor 30 can be one or more cameras. In one or more arrangements, one or more of the cameras can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, or a linear array sensor, just to name a few possibilities. The image capture element may capture images in any suitable wavelength on the electromagnetic spectrum. The image capture element may capture color images and/or grayscale images. One or more of the cameras can be configured with zoom in and/or zoom out capabilities. In one or more arrangements, the sensor 30 can be an infrared sensor. In one or more arrangements, the sensor 30 can be a scanner, a QR code scanner, and/or a bar code scanner.

The one or more sensors 30 can be positioned in any suitable portion of the vehicle 12. For instance, the one or more sensors 30 can be positioned or mounted on or near the front end of the vehicle 12, as shown in FIG. 1 and FIG. 2. In one or more arrangements, the one or more sensors 30 can be positioned or mounted on the underside of the vehicle 12. The one or more sensors 30 can be used to detect a marker 40 positioned on the roadway 14.

The one or more sensors 30 can be operatively connected to a processor 32. "Processor" means any component or group of components that are configured to execute any of the processes described herein or any form of instructions to carry out such processes or cause such processes to be performed. The processor 32 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 32 can include at least one hardware circuit (e.g., an integrated circuit) configured to carry out instructions contained in program code. In arrangements in which there is a plurality of processors 32, such processors can work independently from each other or one or more processors can work in combination with each other. In one or more arrangements, the processor 32 can be a main processor of the vehicle 12. For instance, the processor 32 can be an engine control unit (ECU).

The one or more sensors 30 can be configured to sense at least a portion of a driving environment of the vehicle 12. The driving environment includes area around the vehicle 12. The one or more sensors 30 can be configured to detect, at least, a marker 40 provided along the roadway 14. The marker 40 may also be referred to herein as the charging marker 40. The marker 40, as described below with reference to FIG. 3 and FIG. 4, can generally indicate or correspond to the location of the charge transmitter 24 in the roadway 14. The sensor 30 can communicate data obtained regarding the lane boundary defined by lane markers 34 and marker 40 to the processor 32. The processor 32, responsive to receiving data from the sensor 30, can determine a travel path 44 (FIG. 3 and FIG. 4) for the vehicle 12. The travel path 44 can be determined to provide substantial charging alignment between the charge receiver 16 and the charge transmitter 24. "Substantial charging alignment" as used herein means the charge transmitter 24 and charge receiver 16 are sufficiently aligned when the vehicle passes over the charge transmitter such that sufficiently efficient charging of the vehicle battery 18 is achieved. For instance, sufficiently efficient charging can be charging with an efficiency of 50% or more, 55% or more, 60% or more, 65% or more, 70% or more, 75% or more, 80% or more, 85% or more, 90% or more, 95% or more, just to name a few possibilities.

The vehicle 12 can also include a communication device 36. "Communication device" as used herein means any component, group of components, device, and/or system that is capable of and/or configured to wirelessly transmit and/or receive data over a range of space. The communication device 36 can transmit and/or receive data via Wi-Fi, Bluetooth, RFID, Beacon technology, CDMA, LTE, 3G, 4G, and/or any other type of technology configured to wirelessly transmit and/or receive data. There can also be a communication device 38 included in, on, and/or along the roadway 14. The communication device 38 can be configured to receive data transmitted by the communication device 36 of the vehicle 12. The communication device 38 can be provided in any suitable location in, on, and/or along the roadway 14. In one or more arrangements, the communication device 38 can be operatively connected to the power source 28 and/or one or more charge transmitters 24.

When the charge receiver 16 interacts with the electromagnetic field 20, charging can be initiated between the charge transmitter 24 and charge receiver 16. "Charging" as used herein means a transfer of electrical energy from one source to another. The charge transmitter 24 and charge receiver 16 can have substantially the same resonant frequency. The resonant frequency, $f_o$, of an L-C circuit is a function of the inductance, L, and capacitance, C, according to:

$$f_o = \frac{1}{2\pi\sqrt{LC}} \quad (1)$$

In one or more arrangements, the capacitive element 26 of the charge transmitter 24 can have a capacitance of C and charge transmitter 24 can have an inductance of L. Therefore, the capacitive element 26 and charge transmitter 24 can have a resonant frequency $f_{o1}$. Additionally, the capacitive element 22 of the vehicle 12 can have a capacitance of C', where C' can be any capacitance including C. The charge receiver 16 can have an inductance of L', where L' can be any inductance including L. Therefore, the capacitive element 22 of the vehicle 12 and the charge receiver 16 can have a resonant frequency $f_{o2}$. The charging system 10 can be configured where LC≈'C', so that the $f_{o1} \approx f_{o2}$. Therefore, the charging system 10 can be configured where the charge transmitter 24 and charge receiver 16 can be substantially in resonance with one another. When the charge transmitter 24 and charge receiver 16 are substantially in resonance with one another, the electromagnetic field 20 can be communicated over a larger distance than if the charge transmitter 24 and charge receiver 16 are not in resonance. However, it should be understood that the system does not require the charge transmitter 24 and charge receiver 16 to be in resonance with one another.

When the charge transmitter 24 is activated, the charge transmitter 24 can output the electromagnetic field 20. In one or more arrangements, the electromagnetic field 20 can be a directional field. The electromagnetic field 20 can have substantially the same resonant frequency as the L-C circuit formed by the operative connection between the charge transmitter 24 and the capacitive element 26. The electromagnetic field 20 can interact with the charge receiver 16. The charge transmitter 24 and charge receiver 16 can be substantially in resonance with one another, so the charge transmitter 24 can communicate power at a distance without significantly compromising efficiency. The electromagnetic field 20 can induce a current in the L-C circuit formed by the charge receiver 16 and the capacitive element 22 of the vehicle 12. The current induced in the L-C circuit can be communicated to the battery 18, charging the battery 18. This form of charging is known as inductive resonance charging. However, it will be understood that arrangements described herein are not limited to this form of charging.

Figure 3:
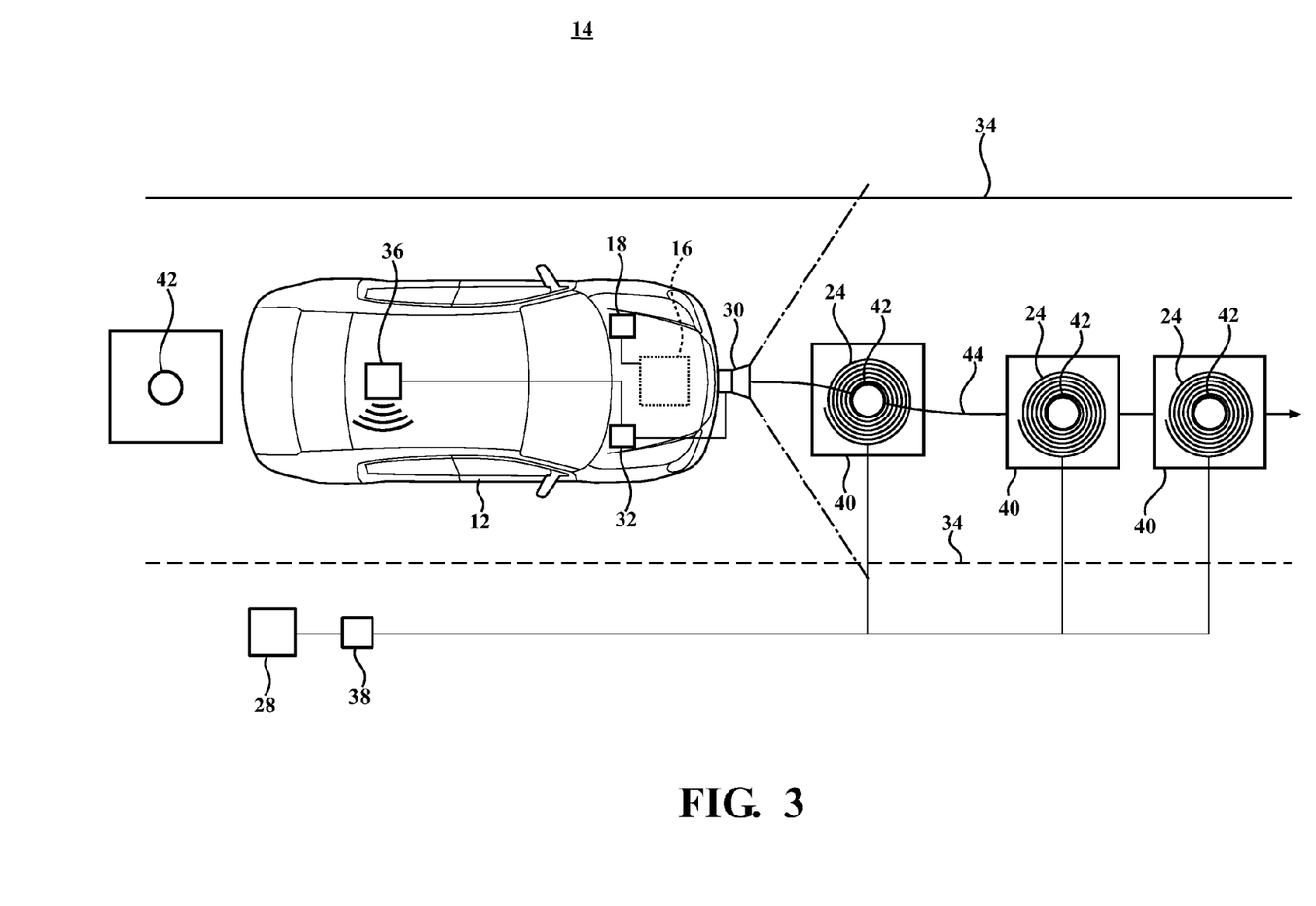
FIG. 3 is a view of an example of a wireless charging roadway system.

Referring now to FIG. 3, a view of the dynamic charging roadway 14 including the charging system 10 is shown. The roadway 14 includes one or more charging markers 40. "Charging markers" as used herein means any indicia to provide information about the presence and/or location of at least one charge transmitter embedded in the roadway 14. "Embedded" as used herein means at or below a travel surface of a roadway. In the example shown in FIG. 3, the charging markers 40 can be positioned on or along the roadway 14 directly or substantially directly above the charge transmitters 24 embedded in the roadway. "Positioned on or along" as used herein means that the marker may be either positioned on the surface of the roadway directly, or may be positioned where it is viewable from a vehicle traveling along the roadway, e.g. on a sign. In some instances, the charging markers 40 can be offset and/or spaced from the associated charge transmitter(s) 24 in one or more directions. In one or more arrangements, the charging markers 40 can be formed on the roadway 14 via paint, glue, stain, tape, or any other way of depositing markings on the roadway 14.

The charging markers 40 can also include a center point 42. The center point 42 indicates the center of the charge transmitter 24 and/or the ideal charge transmission point. "Ideal charge transmission point" is a point where the charge transmitter and charge receiver are so aligned that their efficiency is maximized relative to any other position. The ideal charge transmission point may be, but does not necessarily have to be, the center of the charge transmitter 24. The center point 42 can be positioned anywhere within the periphery of the marker 40, as long as it indicates the center of the charge transmitter 24, and/or the ideal charge transmission point of the charge transmitter 24. In one or more arrangements, only the center point 42 can be positioned on the roadway 14 to serve as the marker 40.

In one or more arrangements, as shown in FIG. 3, the sensor 30 can be a camera mounted in a forward-facing orientation and detect markers 40 that are in front of the vehicle 12 in the travel direction. When the sensor 30 captures an image that has markers 40, the sensor 30 can communicate the image to the processor 32. The processor 32 can process the image to determine where the markers 40 are positioned relative to the roadway 14. In the example where the center point 42 is included on the marker 40, the processor 32 can also determine the location of the center point 42. Since the markers 40 in the example shown in FIG. 3 are positioned above the charge transmitters 24 in the roadway, the processor 32 can determine a travel path 44 so that the charge receiver 16 passes over the markers 40. The travel path 44 can also plan to pass over the center point 42 so that the center of the charge transmitter 24 is directly under the center of the charge receiver 16. In one or more arrangements, the processor 32 can determine a travel path 44 at least partially based on the lane markers 34.

By creating the travel path 44 based on the markers 40, and optionally the center point 42 and/or lane markers 34, the processor 32 can create the travel path 44 where substantial charging alignment occurs between each of the charge transmitters 24 and the charge receiver 16 as the charge receiver 16 passes over each relative charge transmitter 24. In the example shown in FIG. 3 where the marker 40 is positioned above the charge transmitter 24, substantial charging alignment occurs between the charge receiver 16 on the vehicle 12, the marker 40 on the roadway 14, and the charge transmitter 24 embedded in the roadway 14.

In one or more arrangements, the sensor 30 can be configured to further detect lane markers 34. The processor 32 can use the position of the lane markers 34 relative to the markers 40 in order to construct the travel path 44 so that the vehicle 12 passes over the charge transmitters 24, so long as the vehicle 12 is located within the driving lane created by the lane markers 34. Accordingly, the processor 32 can create a travel path 44 limited to the boundary limits of the lane marked by lane markers 34. "Boundary limits" as used herein means the area limited to in-between lane markers directly adjacent to and on both sides of a vehicle as it drives along a roadway. While only one sensor 30 is shown mounted on the vehicle 12, it will be understood that more than one sensor can be used, including lane sensors that are configured to detect the boundary limits of a lane on the roadway 14. In arrangements in which there are a plurality of sensors 30, the sensors 30 can work independently from each other. Alternatively, two or more of the sensors 30 can work in combination with each other. In such case, the two or more sensors 30 can form a sensor network. The at least one sensor 30 can be operatively connected to one or more elements of the vehicle 12 or the roadway 14 (e.g., processor 32, communication device 36, etc.).

In one or more arrangements, the vehicle 12 can include a display (not shown). The display can be a heads-up display, and/or a screen positioned anywhere in the vehicle which is safely viewable by a driver or operator. The travel path 44 can be shown on the display so that the driver or operator can drive along the travel path 44 depicted on the display. Alternatively, the travel path 44 can be automatically executed by the vehicle 12 where the vehicle 12 is an autonomous or highly automated vehicle. Also, the travel path 44 can be prompted to a vehicle occupant for permission to implement the determined travel path. Responsive to receiving permission to implement the determined travel path from the vehicle occupant, the vehicle can implement the determined travel path automatically.

In the example shown in FIG. 3, the communication device 36 can broadcast the geographic location of the vehicle 12. The communication device 36 can broadcast coordinates, latitude and longitude, or any other type of data usable to determine geographic location. The communication device 38 associated with the roadway 14 can use the geographic location of the vehicle 12 to activate specific charge transmitters 24 that are on or along the travel path 44 of the vehicle 12. The communication device 38 can selectively transfer power from the power source 28 to the at least one charge transmitter 24.

Figure 4:
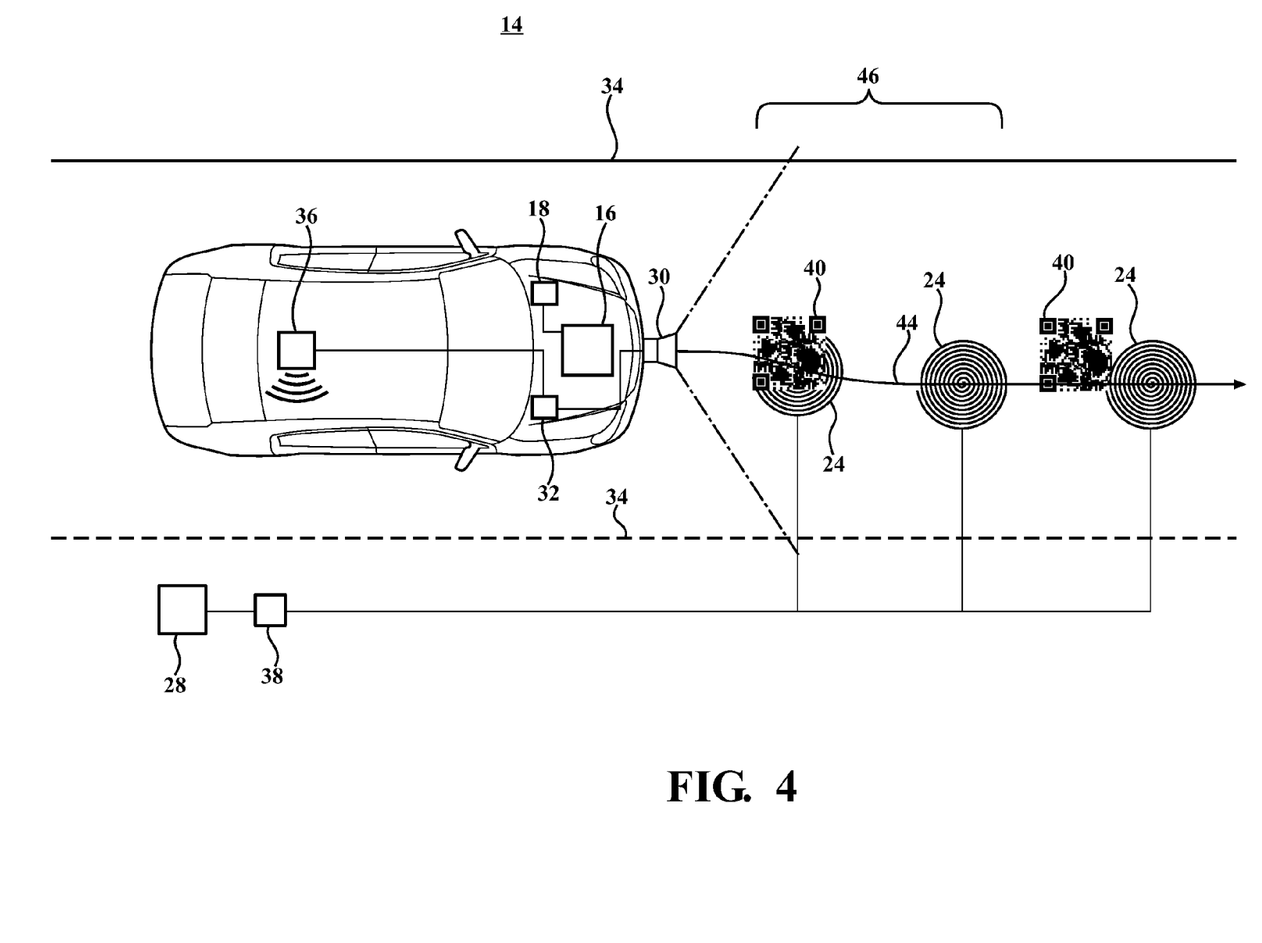
FIG. 4 is a view of another example of a wireless charging roadway system.

Referring now to FIG. 4, another view of an alternative example of the dynamic charging roadway 14 is shown. In FIG. 4, the marker 40 is an encoded marker. "Encoded marker" as used herein means any marking that relates to data corresponding to a presence and/or location of at least one charge transmitter 24, wherein the encoded marker is detected by a sensor and interpreted by the processor. "Corresponding to" as used herein with reference to markers means the marker is positioned in a location where the vehicle can identify the marker and interpret the location of a charge transmitter. The marker 40 can be a barcode, a QR code, or any other encoded marker positioned on or along the roadway that is encoded to indicate, at least, the location of at least one charge transmitter 24 embedded in a segment 46 of the roadway 14. The segment 46 is defined herein as a series of one or more charge transmitters 24 embedded over a portion of the roadway 14. Although the marker 40 is shown as an encoded marker, it could also be coordinates, a latitude and a longitude, or any other kind of data written or displayed on or along the roadway 14 that can be used to determine the location of at least one charge transmitter 24. Furthermore, although shown positioned on the roadway 14, the marker 40 can be positioned on a roadway sign (not shown) similar to a speed limit sign, on an overpass sign (not shown), or any other signs viewable by the sensor 30.

In one or more arrangements, where the marker 40 is an encoded marker, the encoded data can also include the location of the next marker 40 following the segment 46, the speed limit of the roadway 14 in that location, various charging parameters of the charge transmitters 24 over the segment 46, or any other data that may be useful to the vehicle 12.

When the sensor 30 detects the presence of the marker 40, the communication device 36 can broadcast a signal to initiate all of the charge transmitters 24 within the segment 46. In this example, the communication device 36 would not necessarily have to send the geographic location, it could simply be a smaller bandwidth signal because the vehicle 12 knows which charge transmitters 24 should be active based on the data encoded in the marker 40.

Figure 5:
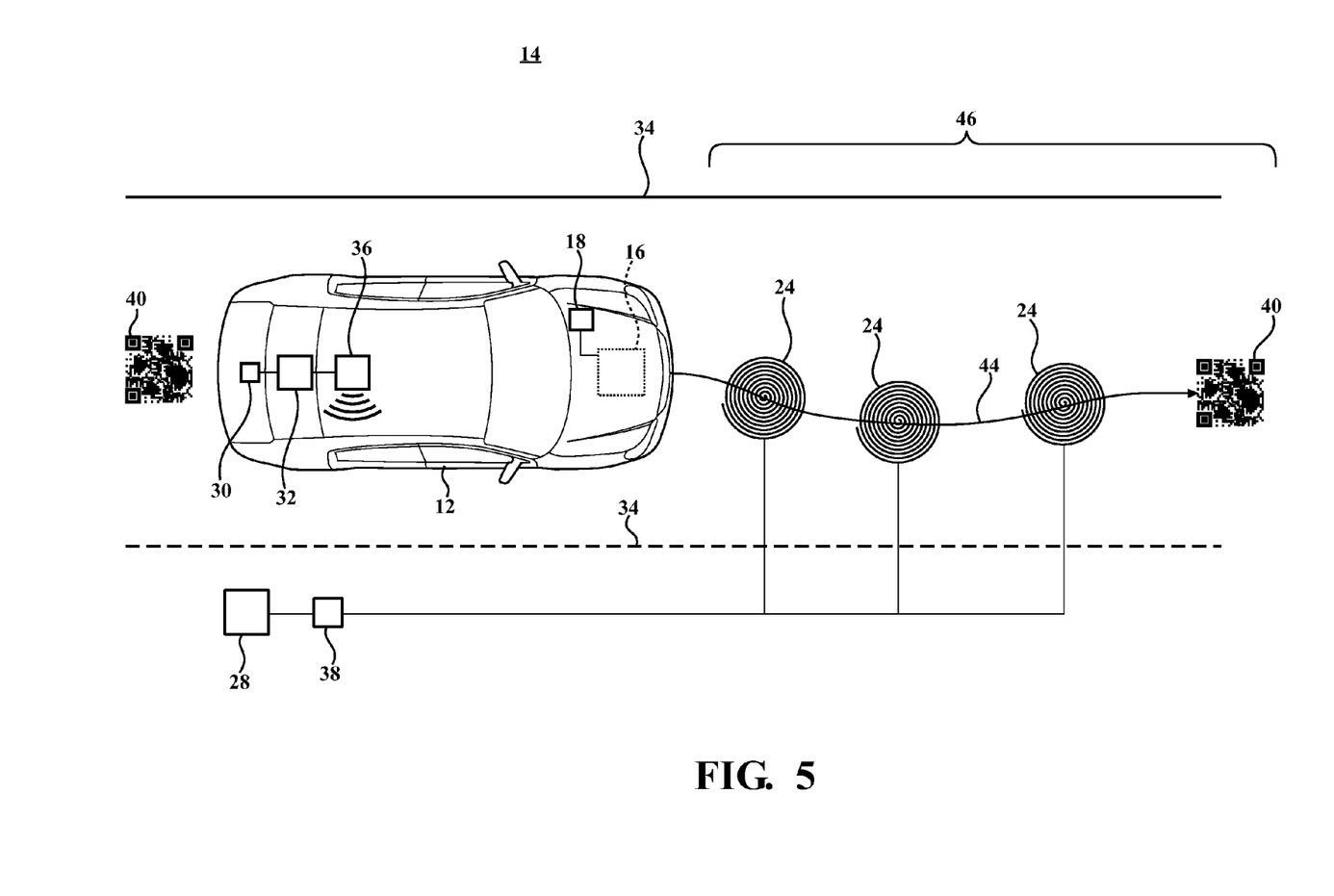
FIG. 5 is a view of another example of a wireless charging roadway system.

Referring now to FIG. 5, another view of another example of the charging roadway 14 is shown. In this example, the sensor 30 can be mounted on the underside of the vehicle 12 and the sensor 30 can capture an image of the roadway 14 from a top view. Also, there can be some distance between the marker 40 and the first charge transmitter 24 in the segment 46 of the roadway 14. The distance between the marker 40 and the first charge transmitter 24 permits the travel path 44 created by the processor 32 to be smoother because there is more space for the vehicle 12 to maneuver into position where substantial charging alignment between the charge transmitter 24 and charge receiver 16 can be achieved. As stated above, there can be additional sensors positioned on the vehicle 12 to detect the lane markers 34. Additionally or alternatively, the sensor 30 can be configured to detect the lane markers 34. The processor 32, in creating the travel path 44, can limit the travel path 44 where the vehicle 12 remains positioned between the lane markers 34.

Figure 6:
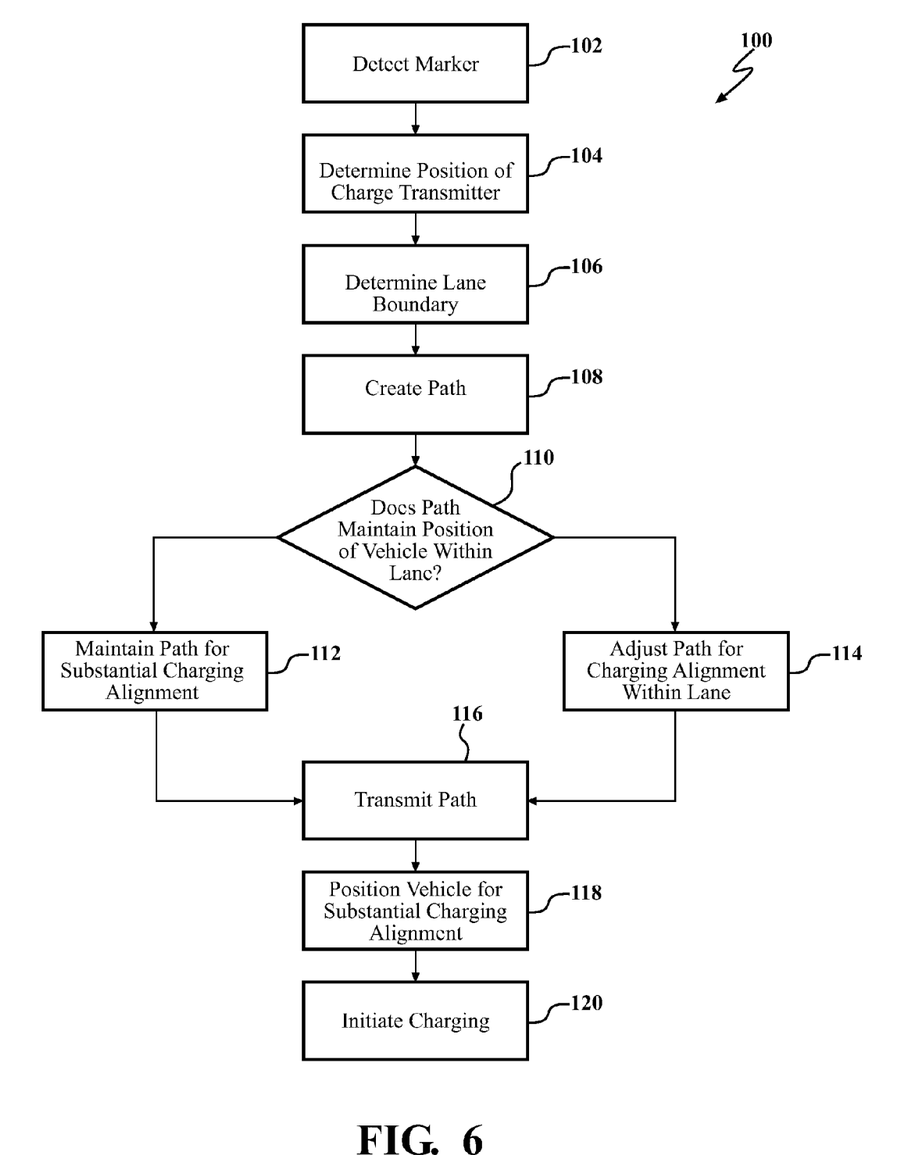
FIG. 6 is an example of a method of wirelessly charging a vehicle power source.

Now that the various potential systems, devices, elements and/or components of the system 10 have been described, various methods of charging the battery of a vehicle will now be described. Referring now to FIG. 6, an example of a method of charging the battery of a vehicle is shown. Various possible steps of method 100 will now be described. The method 100 illustrated in FIG. 6 may be applicable to the embodiments described above in relation to FIGS. 1-5, but it is understood that the method 100 can be carried out with other suitable systems and arrangements. Moreover, the method 100 may include other steps that are not shown here, and in fact, the method 100 is not limited to including every step shown in FIG. 6. The steps that are illustrated here as part of the method 100 are not limited to this particular chronological order. Indeed, some of the steps may be performed in a different order than what is shown and/or at least some of the steps shown can occur simultaneously.

At block 102, the vehicle 12 can detect the marker 40. As stated above, the marker 40 can be positioned on or along the roadway 14. The marker 40 can be positioned directly above the charge transmitter 24 as shown in FIG. 3, or the marker 40 can be encoded to describe the location of the charge transmitter 24 as shown in FIG. 4 and FIG. 5. Where the marker 40 is an encoded marker, the method can further include decoding the encoded marker to obtain a position of at least one charge transmitter 24 embedded in a segment 46 of the roadway 14. The method can continue to block 104.

At block 104, when the vehicle 12 detects the marker 40, the vehicle can determine the position of the charge transmitter 24. The method can continue to block 106.

At block 106, the vehicle 12 can determine the lane boundary by detecting lane markers 34. The method can then continue to block 108.

At block 108, when the vehicle 12 determines the location of the charge transmitter 24 and, optionally, the lane boundary, the vehicle 12 can create the travel path 44. The method can continue to block 110.

At block 110, the processor 32 can compare the travel path 44 with the lane boundary. If the processor 32 determines that the travel path 44 maintains the position of the vehicle 12 within the lane boundary, the method can continue to block 112. At block 112, the vehicle 12 can maintain the travel path 44 for substantial charging alignment. The method can continue to block 116. If the processor 32 determines that the travel path 44 is outside of the lane boundary, the method can continue to block 114. At block 114, the travel path 44 can be adjusted for charging alignment within the lane. The method can continue to block 116.

At block 116, the travel path 44 can be presented to a vehicle occupant. For instance, the travel path 44 can be presented to the driver or operator via a display in the vehicle 12, or the travel path 44 can be automatically executed where the vehicle 12 is an autonomous or highly automated vehicle. In such case, the processor and/or an autonomous driving module can cause the vehicle to perform one or more maneuvers by controlling one or more vehicle systems (e.g., propulsion, braking, steering, throttle, transmission, etc.). As used herein, "cause" or "causing" means to make, force, compel, direct, command, instruct, and/or enable an event or action to occur or at least be in a state where such event or action may occur, either in a direct or indirect manner.

The method can continue to block 118. At block 118, the vehicle 12 can be moved into a position in which one of the charge transmitters 24 and the charge receiver 16 are in substantial charging alignment. The method can continue to block 120. At block 120, when the charge transmitter 24 and charge receiver 16 are in substantial charging alignment, charging can be initiated. As described above, the charge transmitter 24 can output the electromagnetic field 20 which is received by the charge receiver 16. Current can be generated in the charge receiver 16 and the current can be transmitted to the battery 18, charging the battery 18. Accordingly, charging can be initiated from the charge transmitter 24 to the charge receiver 16 while the vehicle 12 and charge receiver 16 are in motion.

Methods can include other steps that are not shown here, and in fact, methods are not limited to including every step described. Furthermore, the steps detailed here as part of the method for dynamically wirelessly charging the vehicle are not limited to this particular chronological order. Indeed, some of the steps can be performed in a different order than what is described and/or at least some of the steps can occur simultaneously.

It will be appreciated that arrangements described herein can provide numerous benefits, including one or more of the benefits mentioned herein. For example, arrangements described herein can maximize the wireless charging of a vehicle. Arrangements described herein provide the exact location of charge transmitter(s) embedded in the roadway. Arrangements provided herein optimize a travel path that a vehicle or driver takes to maximize charging efficiency. Arrangements described herein can provide substantial charging alignment between the charge transmitter(s) embedded in the roadway and the charge receiver mounted on the vehicle. Arrangements described herein can provide drivers with efficient charging while driving their vehicle down the roadway.

All terms defined at any point in the disclosure are to be used for that term throughout the disclosure and claims. Furthermore, any terms defined herein should be given their broadest interpretation to incorporate any equivalents and substitutes as allowed by law.

In the foregoing description, reference is made to the accompanying drawings, which form a part thereof, and in which is shown by way of illustrating specific embodiments in which the disclosure may be practiced. In this regard, directional terminology, such as "top", "bottom", "front", "back", "leading", "trailing", "lateral", "longitudinal", etc. is used with reference to the orientation of the respective figure being described. Because components of the preceding examples can be positioned in a number of different orientations, the directional terminology is used for purposes of illustration and is in no way limiting. It is to be understood that other examples may be utilized and structural or logical changes may be made without departing from the scope of the present disclosure.

The foregoing description is merely illustrative in nature and is in no way intended to limit the disclosure, its application, or uses. As used, the phrase at least one of A, B, and C should be construed to mean a logical (A or B or C), using a non-exclusive logical "or." It should be understood that the various steps within a method can be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple aspects having stated features is not intended to exclude other aspects having additional features, or other aspects incorporating different combinations of the stated features.

As used herein, the terms "comprise" and "include" and their variants are intended to be non-limiting, such that recitation of items in succession or a list is not to the exclusion of other like items that can also be useful in the devices and methods of this technology. Similarly, the terms "can" and "may" and their variants are intended to be non-limiting, such that recitation that an aspect can or may comprise certain elements or features does not exclude other aspects of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

What is claimed is:

1. A charging system for a vehicle comprising:
    a charge receiver;
    a sensor configured to sense a driving environment of the vehicle to detect:
        a plurality of lane markers extending along a roadway, the plurality of lane markers defining a lane boundary;
        a charging marker, the charging marker providing information relating to a location of a charge transmitter located at or below a travel surface of the roadway and at least partially within the lane boundary, the charge transmitter being located forward of the vehicle in a travel direction of the roadway; and
    a processor operatively connected the sensor, the processor being configured to:
        determine the location of the charge transmitter based on the information obtained from the charging marker;
        determine a travel path for the vehicle based at least partially on the location of the charge transmitter and the plurality of lane markers so that:
            a position of the vehicle is maintained within the lane boundary defined by the plurality of lane markers; and
            the charge receiver is positioned in substantial charging alignment with the charge transmitter when the vehicle passes over the charge transmitter; and
        causing the vehicle to autonomously implement the travel path whereby the vehicle is continuously positioned along the travel path, and wherein the vehicle is caused to autonomously implement the travel path by autonomously executing one or more maneuvers to follow the travel path.

2. The charging system of claim 1, wherein the charging marker is encoded, and wherein the processor is configured to obtain information from the charging marker.

3. The charging system of claim 1, wherein the sensor is a camera.

4. The charging system of claim 1, wherein the processor is further configured to:
    present the travel path to a vehicle occupant.

5. The charging system of claim 1, wherein the processor is further configured to:
    prompt a vehicle occupant for permission to implement the travel path; and
    responsive to receiving permission to implement the travel path, cause the vehicle to implement the travel path.

6. The system of claim 1, wherein the lane boundary defines a travel lane in which the vehicle is currently operating.

7. A method of charging a battery of a vehicle while traveling on a roadway, the method comprising:
    sensing a driving environment of a vehicle to detect:
        a plurality of lane markers extending along a roadway, the plurality of lane markers defining a lane boundary; and a charging marker located along the roadway, the charging marker providing information relating to a location of one or more charge transmitters embedded in the roadway, the one or more charge transmitters being located forward of the vehicle and at least partially within the lane boundary defined by the lane markers;

determining a location of the one or more charge transmitters embedded in the roadway based on information obtained from the charging marker;

determining a travel path for the vehicle based at least partially on the location of the one or more charge transmitters and the plurality of lane markers so that:

a position of the vehicle is maintained within the lane boundary defined by the plurality of lane markers; and a charge receiver of the vehicle is positioned in substantial charging alignment with a charge transmitter of the one or more charge transmitters the vehicle passes over the charge transmitter;

causing the vehicle to autonomously implement the travel path, whereby the vehicle is continuously positioned along the travel path, and wherein causing the vehicle to autonomously implement the travel path includes autonomously executing one or more maneuvers to follow the travel path; and charging, via the charge receiver, one or more batteries of the vehicle as the vehicle passes over the charge transmitter and continues along the determined travel path.

8. The method of claim 7, further including:

presenting the determined travel path to a vehicle occupant.

9. The method of claim 7, wherein causing the vehicle to autonomously implement the travel path is performed responsive to receiving an input corresponding to permission to implement the travel path.

10. The method of claim 7, wherein the lane boundary defines a travel lane in which the vehicle is currently operating.

* * * * *

UNITED STATES PATENT AND TRADEMARK OFFICE
CERTIFICATE OF CORRECTION

PATENT NO. : 10,005,367 B2
APPLICATION NO. : 14/813437
DATED : June 26, 2018
INVENTOR(S) : Jae Seung Lee, Atsushi Iwai and Paul Donald Schmalenberg It is certified that error appears in the above-identified patent and that said Letters Patent is hereby corrected as shown below:

In the Specification

Column 6, Line 54, delete "LC≈'C'" and insert --LC≈L'C'--.

In the Claims

Claim 1, Column 12, Line 39, delete "path" and insert --path,--.

Signed and Sealed this
Twenty-eighth Day of May, 2019

Andrei Iancu
*Director of the United States Patent and Trademark Office*